US006272724B1

(12) United States Patent
Sterling et al.

(10) Patent No.: US 6,272,724 B1
(45) Date of Patent: Aug. 14, 2001

(54) BLADE REMOVING TOOL FOR ROTARY LAWN MOWERS

(76) Inventors: Kevin R. Sterling, 40551 W. 1$^{st}$ Ave., Umatilla, FL (US) 32784-8056; Laurence E. Holstein, 4606 S. Gid Hall Point, Inverness, FL (US) 34452

( * ) Notice: Subject to any disclaimer, the term of this patent is extended or adjusted under 35 U.S.C. 154(b) by 0 days.

(21) Appl. No.: 09/532,424

(22) Filed: Mar. 23, 2000

(51) Int. Cl.$^7$ ............................................. B23Q 3/00
(52) U.S. Cl. ............................................. 29/281.1; 29/283
(58) Field of Search ............................ 29/281.1, 281.5, 29/283, 240, 267, 270; 76/82.1; 254/17, 131, 15; 248/228, 231.7; 451/371

(56) References Cited

U.S. PATENT DOCUMENTS

| | | | |
|---|---|---|---|
| 4,564,991 | * 1/1986 | Taylor | 29/283 |
| 4,882,960 | * 11/1989 | Kugler | 29/283 |
| 4,956,905 | * 9/1990 | Davidson | 29/281.1 |
| 5,865,018 | * 2/1999 | Wanie | 29/283 |

* cited by examiner

Primary Examiner—Robert C. Watson

(57) ABSTRACT

A blade removing tool for rotary lawn mowers includes a central support assembly forming a guide adapted to be positioned over a bolt holding a rotary lawn mower blade in position and to allow the passage of a socket wrench there through. An elongated handle has an interior end coupled to the support assembly and an exterior end adapted to held by a user. A pair of projections extend downwardly from the lower plate parallel with the handle and adapted to be positioned on opposite sides of a blade to contact the blade when a socket wrench tends to turn a bolt and the blade.

3 Claims, 3 Drawing Sheets

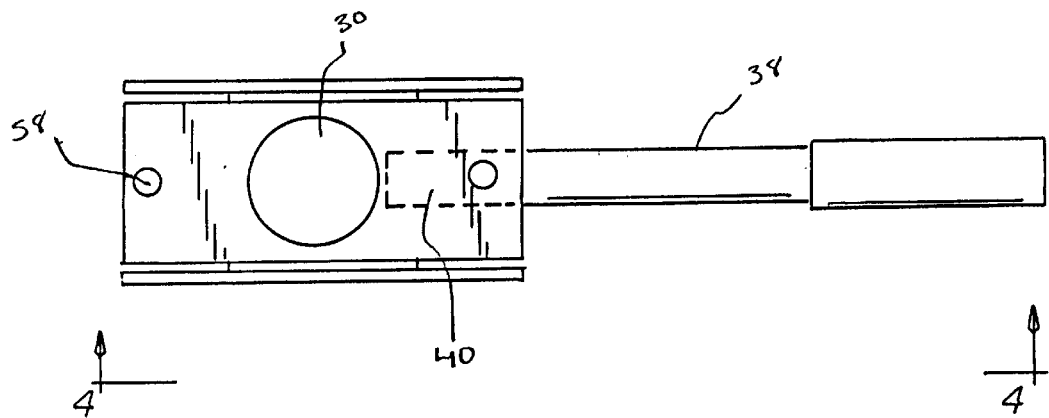
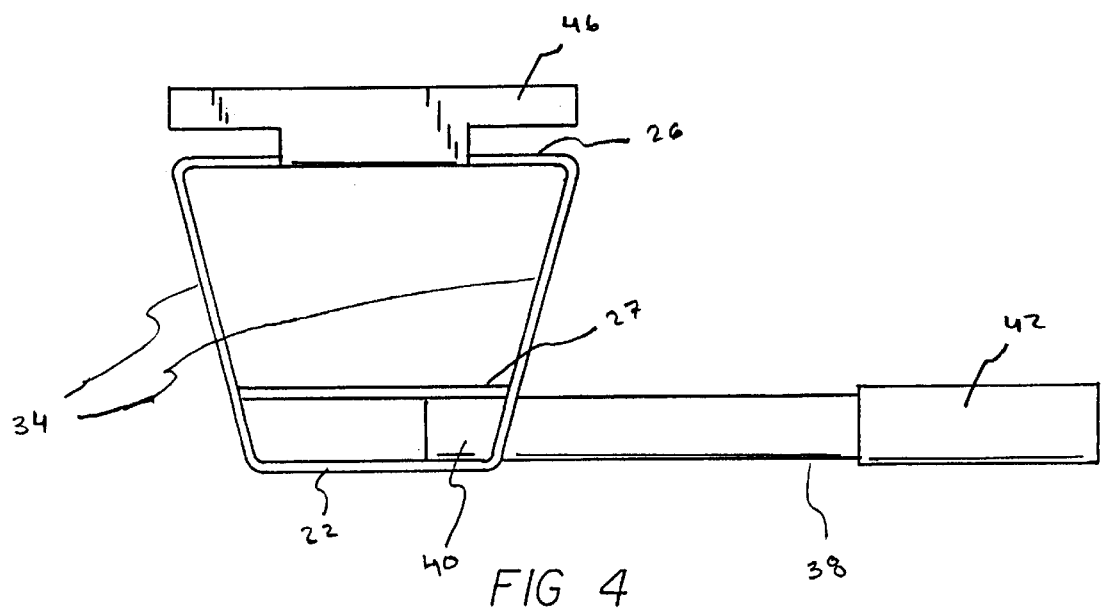

BLADE REMOVING TOOL FOR ROTARY LAWN MOWERS

BACKGROUND OF THE INVENTION

1. Field of the Invention

The present invention relates to a new and improved blade removing tool for rotary lawn mowers and, more particularly, pertains to facilitating the safe and convenient removal of a bolt holding the rotary blade to the motor of a lawn mower.

2. Description of the Prior Art

The use of lawn mover tools of known designs and configurations is known in the prior art. More specifically, lawn mover tools of known designs and configurations heretofore devised and utilized for the purpose of changing lawn mower blades through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of Lawn mower tools of known designs and configurations. By way of example, U.S. Pat. No. 4,564,991 to Harold E. Taylor discloses a tool for holding a blade for installation and removal thereof. U.S. Pat. No. 4,736,544 to Lawrence Greenquist discloses a blade holder for sharpening lawnmower blades. U.S. Pat. No. 4,956,905 to Leonard D. Davidson discloses a tool for holding a rotatable lawn mower blade. Lastly, U.S. Pat. No. 5,865,018 to Todd R. Wanie discloses a cutter blade removal tool.

In this respect, the blade removing tool for rotary lawn mowers according to the present invention substantially departs from the conventional concepts and designs of the prior art, and in doing so provides an apparatus primarily developed for the purpose of facilitating the safe and convenient removal of a bolt holding the rotary blade to the motor of a lawn mower.

Therefore, it can be appreciated that there exists a continuing need for a new and improved blade removing tool for rotary lawn mowers which can be used to facilitate the safe and convenient removal of a bolt holding the rotary blade to the motor of a lawn mower. In this regard, the present invention substantially fulfills this need.

SUMMARY OF THE INVENTION

In view of the foregoing disadvantages inherent in the known types of lawn mower tools of known designs and configurations now present in the prior art, the present invention provides a new and improved blade removing tool for rotary lawn mowers. As such, the general purpose of the present invention, which will be described subsequently in greater detail, is to provide a new and improved blade removing tool for rotary lawn mowers and method which have all the advantages of the prior art and none of the disadvantages.

To attain this, the present invention essentially comprises a lawn mower blade remover. First provided is a bolt. The bolt holds the rotary blade to the motor of a lawn mower. Next provided is a central support assembly. The central support assembly has a short horizontal upper plate and a a long horizontal lower plate. The central support assembly also has a horizontal intermediate plate located between the upper and lower plates. A circular aperture is formed in each of the plates in axial alignment to form a vertical guide through the plates. The assembly has tapering sides plates coupling the horizontal plates together to hold the support assembly in a rigid trapezoidal orientation. The support assembly and apertures form a guide and are adapted to be positioned over a bolt holding a rotary lawn mower blade in position and to allow the passage of a socket wrench through the apertures for loosening and/or tightening a bolt axially aligned beneath the aperture of the lower plate. An elongated handle is next provided. The elongated handle has an interior end extending through one of the side plates. The elongated handle also has an exterior end adapted to held by a user. The handle functions to retain the support assembly against rotation during operation and use. A pair of projections, each in an inverted T-shaped configuration, extend downwardly from the lower plate parallel with the handle. The projections are adapted to be positioned on opposite sides of a blade during operation and use to contact the blade when a socket wrench tends to turn a bolt and the blade with resistance being provided by the user through the handle. An optional adapter is provided. The adapter is formed of an elongated plate. The adapter has an upper surface in contact with the lower surface of the lower plate. A central aperture is provided in the adapter adjacent to the aperture of the lower plate. The adapter has downwardly extending end sections adapted to contact the lawn mower blade during the loosening and/or tightening of the bolt. The end sections extend away from the lower plate a greater distance than the pair of projections. Small apertures are provided in the optional adapter and lower plate. The small adapters are in mutual alignment. Associated bolts are provided. The bolts extend through the small apertures. Associated nuts are coupled to the bolts to hold the supplemental plate in position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved blade removing tool for rotary lawn mowers which has all the advantages of the prior art lawn mower tools of known designs and configurations and none of the disadvantages.

It is another object of the present invention to provide a new and improved blade removing tool for rotary lawn mowers which may be easily and efficiently manufactured and marketed.

It is a further object of the present invention to provide a new and improved blade removing tool for rotary lawn mowers which is of a durable and reliable construction.

An even further object of the present invention is to provide a new and improved blade removing tool for rotary lawn mowers which is susceptible of a low cost of manufacture with regard to both materials and labor, and which accordingly is then susceptible of low prices of sale to the consuming public, thereby making such a blade removing tool for rotary lawn mowers economically available to the buying public.

Even still another object of the present invention is to facilitate the safe and convenient removal of a bolt holding the rotary blade to the motor of a lawn mower.

Lastly, it is an object of the present invention to provide a new and improved blade removing tool for rotary lawn mowers including a central support assembly. The support assembly has guides adapted to be positioned over a bolt holding a rotary lawn mower blade in position and to allow the passage of a socket wrench there through. An elongated handle has an interior end coupled to the support assembly. It also has an exterior end adapted to be held by a user and a pair of projections extending downwardly from the lower plate parallel with the handle. The projections are adapted to be positioned on opposite sides of a blade to contact the blade when a socket wrench tends to turn a bolt and the blade.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom view of the tool shown in the prior figures.

FIG. 4 is a side elevational view taken along line 4—4 of FIG. 3.

The same reference numerals refer to the same parts throughout the various Figures.

DESCRIPTION OF THE PREFERRED EMBODIMENT

Figure 1:
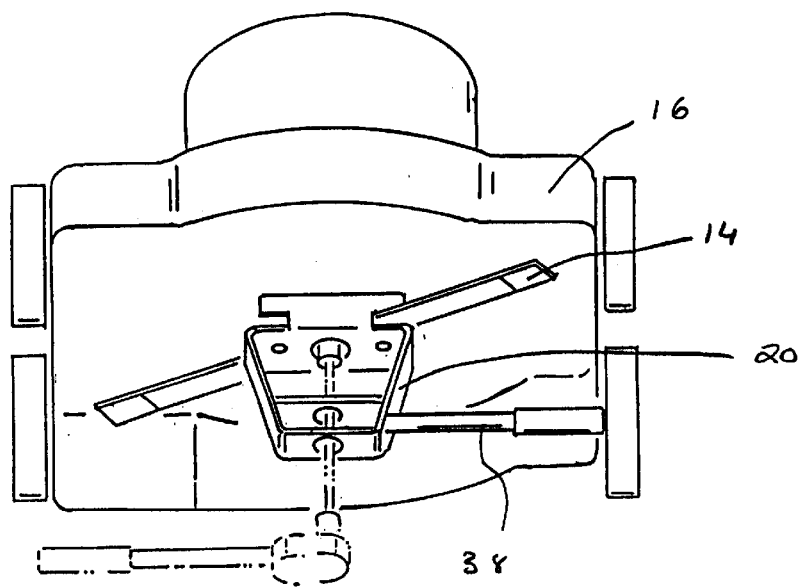
FIG. 1 is a perspective illustration of the preferred embodiment of the blade removing tool for rotary lawn mowers constructed in accordance with the principles of the present invention.
Figure 2:
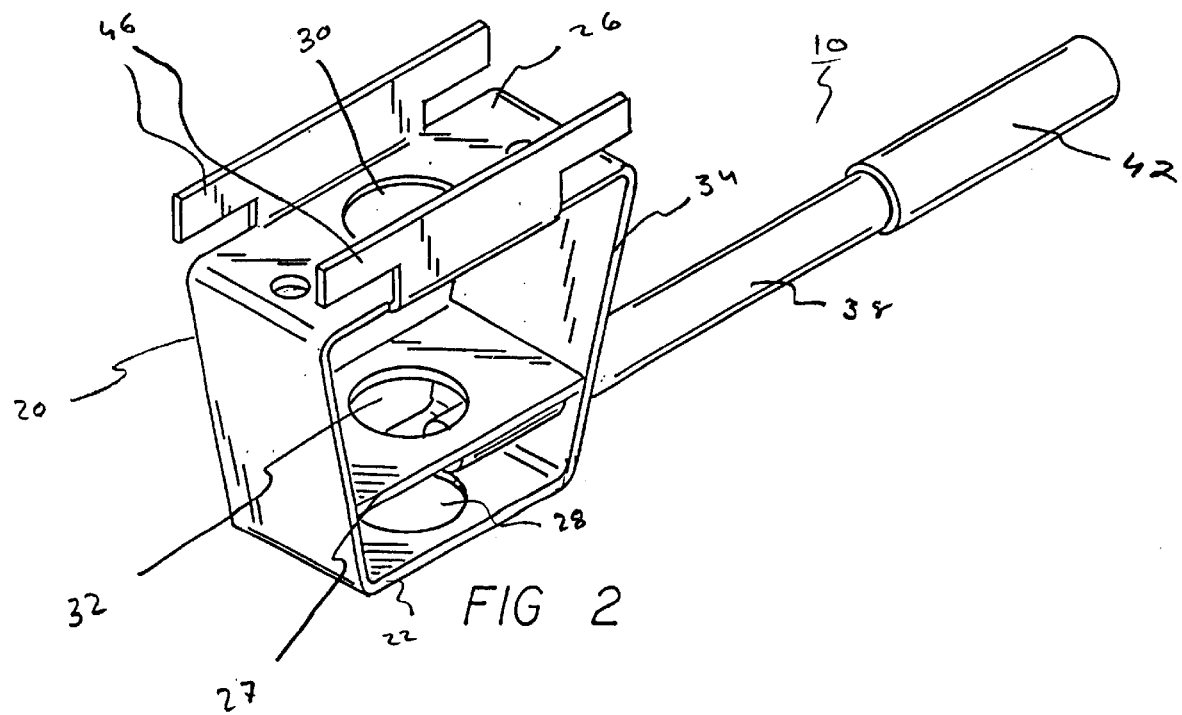
FIG. 2 is a bottom perspective view of the tool as shown in FIG. 1.
Figure 5:
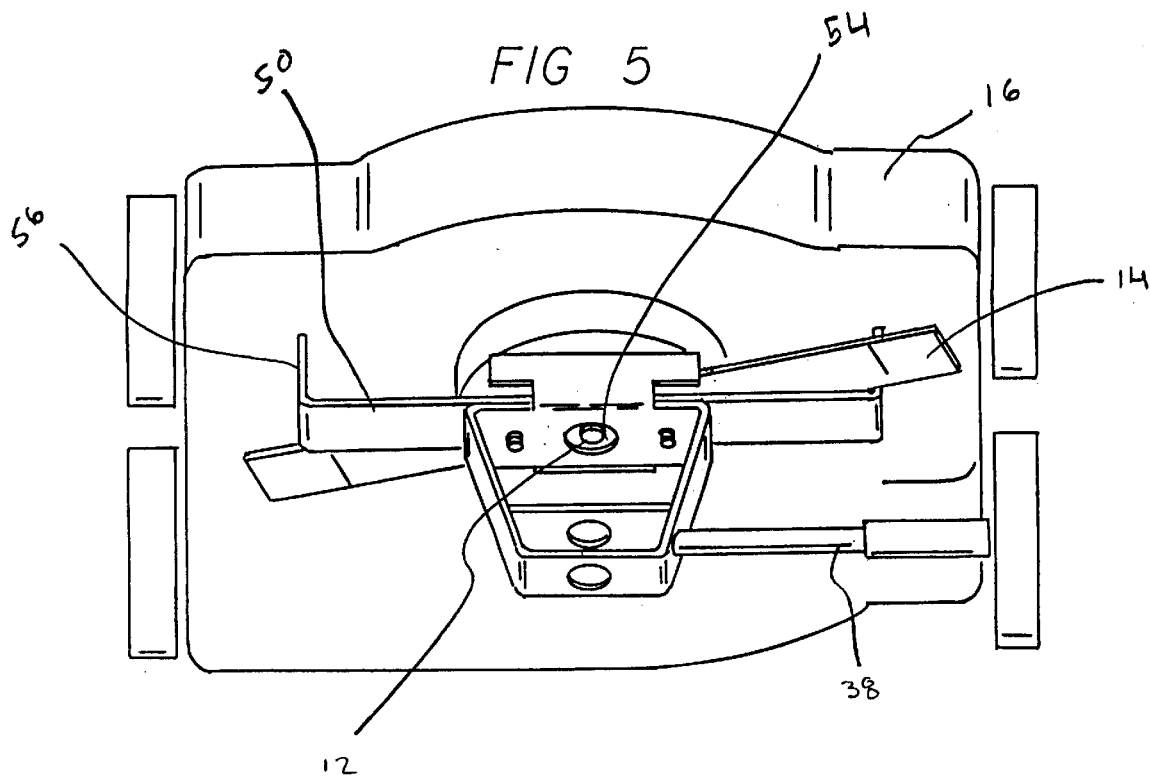
FIG. 5 is a perspective showing of an alternate embodiment of the invention.
Figure 6:
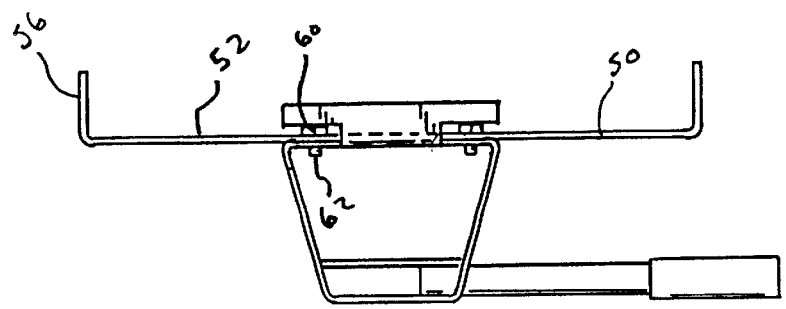
FIG. 6 is a side elevation of the tool shown in FIG. 5.

With reference now to the drawings, and in particular to FIGS. 1 through 6 thereof, the preferred embodiments of the new and improved blade removing tool for rotary lawn mowers embodying the principles and concepts of the present invention and generally designated by the reference numeral 10 will be described.

The present invention, the new and improved blade removing tool for rotary lawn mowers is a system 10 comprised of a plurality of components. Such components, in their broadest context, include a central support assembly, an elongated handle, a pair of projections and an optional adapter. Each of the individual components is specifically configured and correlated one with respect to the other so as to attain the desired objectives.

First provided is a bolt 12. The bolt holds the rotary blade 14 to the motor of a lawn mower 16. Note FIG. 1 in particular wherein the mower is inverted for working on the blade.

Next provided is a central support assembly 20. The central support assembly has a short horizontal upper plate 22 and a long horizontal lower plate 26. The central support assembly also has a horizontal intermediate plate 27 located between the upper and lower plates. A circular aperture 28, 30, 32 is formed in each of the plates in axial alignment to form a vertical guide through the plates. The assembly has tapering sides plates 34 coupling the horizontal plates together to hold the support assembly in a rigid trapezoidal orientation. The support assembly and apertures form a guide and are adapted to be positioned over a bolt holding a rotary lawn mower blade in position and to allow the passage of a socket wrench through the apertures for loosening and/or tightening a bolt axially aligned beneath the aperture of the lower plate.

An elongated handle is next provided. The elongated handle 38 has an interior end 40 extending through one of the side plates. The elongated handle also has an exterior end 42 adapted to be held by a user. The handle functions to retain the support assembly against rotation during operation and use.

A pair of projections 46, each in an inverted T-shaped configuration, extend downwardly from the lower plate parallel with the handle. The projections are adapted to be positioned on opposite sides of a blade during operation and use to contact the blade when a socket wrench tends to turn a bolt and the blade with resistance being provided by the user through the handle.

An optional adapter 50 is provided. The adapter is formed of an elongated plate 52. The adapter has an upper surface in contact with the lower surface of the lower plate with a central aperture 54 adjacent with the aperture of the lower plate. It also has downwardly extending end sections 56 which are adapted to contact the lawn mower blade during the loosening and/or tightening of the bolt. The end sections extend away from the lower plate a greater distance than the pair of projections. Small apertures 58 are provided in the optional adapter and lower plate. The small apertures are in mutual alignment. Associated bolts 60 extend through the small apertures. Associated nuts 62 are coupled to the bolts to hold the supplemental plate in position.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved blade removing tool for rotary lawn mowers to facilitate the safe and convenient removal of a bolt holding the rotary blade to the motor of a lawn mower comprising, in combination:

a central support assembly having a short horizontal upper plate, a long horizontal lower plate and a horizontal intermediate plate there between, with a circular aperture formed in each of the plates in axial alignment to form a vertical guide there through, the assembly having tapering sides plates coupling the horizontal plates together to hold the support assembly in a rigid trapezoidal orientation, the support assembly and apertures forming a guide adapted to be positioned over a bolt holding a rotary lawn mower blade in position and to allow the passage of a socket wrench there through for loosening and/or tightening a bolt axially aligned beneath the aperture of the lower plate:

an elongated handle having an interior end extending through one of the side plates and an exterior end adapted to be held by a user to retain the support assembly against rotation during operation and use;

a pair of projections each in an inverted T-shaped configuration extending downwardly from the lower plate parallel with the handle and adapted to be positioned on opposite sides of a blade during operation and use to contact the blade when a socket wrench tends to turn a bolt and the blade with resistance being provided by the user through the handle; and an optional adapter formed of an elongated plate having an upper surface in contact with the lower surface of the lower plate with a central aperture adjacent with the aperture of the lower plate and with downwardly extending end sections adapted to contact the lawn mower blade during the loosening and/or tightening of the bolt the end sections extending away from the lower plate a greater distance that the pair of projections, the optional adapter and lower plate being provided with small apertures there through in mutual alignment and with bolts extending there trough and associated nuts to hold the supplemental plate in position.

2. A blade removing tool for rotary lawn mowers comprising:

a central support assembly with an upper plate and a lower plate parallel with each other and positionable parallel with a lawn mower blade to be removed, the plates forming a guide, adapted to be positioned over a bolt holding a rotary lawn mower blade in position, the plates each having a central aperture to allow the passage of a socket wrench there through;

an elongated handle having an interior end coupled to the support assembly and an exterior end adapted to be held by a user; and a pair of projections extending downwardly from the lower plate parallel with the handle and adapted to be positioned on opposite sides of a blade with the bolt there between to contact the blade when a socket wrench tends to turn a bolt and the blade.

3. The tool as set forth in claim 2 and further including an optional adapter formed of an elongated plate having an upper surface in contact with the lower surface of the support assembly plate with a central aperture adjacent with the guide and with downwardly extending end sections adapted to contact the lawn mower blade during the loosening and/or tightening of the bolt, the end sections extending away from the lower plate a greater distance than the pair of projections.

* * * * *